US008626252B2

(12) United States Patent
Kim et al.

(10) Patent No.: US 8,626,252 B2
(45) Date of Patent: Jan. 7, 2014

(54) MOBILE TERMINAL

(75) Inventors: Eunjung Kim, Seoul (KR); Zhimin Choo, Anyang (KR); Jaeeon Lee, Suwon (KR); Dongguk Kang, Seoul (KR); Seunggeun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/561,966

(22) Filed: Jul. 30, 2012

(65) Prior Publication Data

US 2013/0040711 A1  Feb. 14, 2013

(30) Foreign Application Priority Data

Aug. 8, 2011  (KR) .......................... 10-2011-0078802

(51) Int. Cl.
*H04M 1/00* (2006.01)
*H04M 1/02* (2006.01)
*H04M 1/23* (2006.01)

(52) U.S. Cl.
CPC ............. *H04M 1/0214* (2013.01); *H04M 1/23* (2013.01)
USPC .................... 455/575.1; 455/90.3; 455/575.4; 455/128; 455/347

(58) Field of Classification Search
CPC ....................................................... H04M 1/23
USPC ............. 455/575.1, 575.2, 575.3, 575.4, 347, 455/90.3
See application file for complete search history.

(56) References Cited

U.S. PATENT DOCUMENTS

| 7,868,945 | B2* | 1/2011 | Hong et al. ............... 348/373 |
| 8,295,897 | B2* | 10/2012 | Griffin .................... 455/575.4 |
| 2001/0023816 | A1* | 9/2001 | Kuriyama ................ 200/6 A |
| 2008/0119248 | A1* | 5/2008 | Nissen et al. ............ 455/575.4 |
| 2008/0146275 | A1* | 6/2008 | Tofflinger ............... 455/556.1 |

* cited by examiner

*Primary Examiner* — Duc M Nguyen
(74) *Attorney, Agent, or Firm* — KED & Associates LLP

(57) ABSTRACT

An input unit for an electronic device comprising a body, a first switch adjacent a first location of the body, a second switch adjacent a second location of the body, and a third switch adjacent a third location of the body. When the body moves in a first direction to a first position, the third switch generates a signal to activate a first operational mode and the first and second switches generate signals to perform first and second functions when the body moves in a second direction different from the first direction. When the body moves in the first direction to a second position, the third switch generates a signal to activate a second operational mode and the first and second switches generate signals to perform third and fourth functions when the body moves in the second direction.

20 Claims, 15 Drawing Sheets

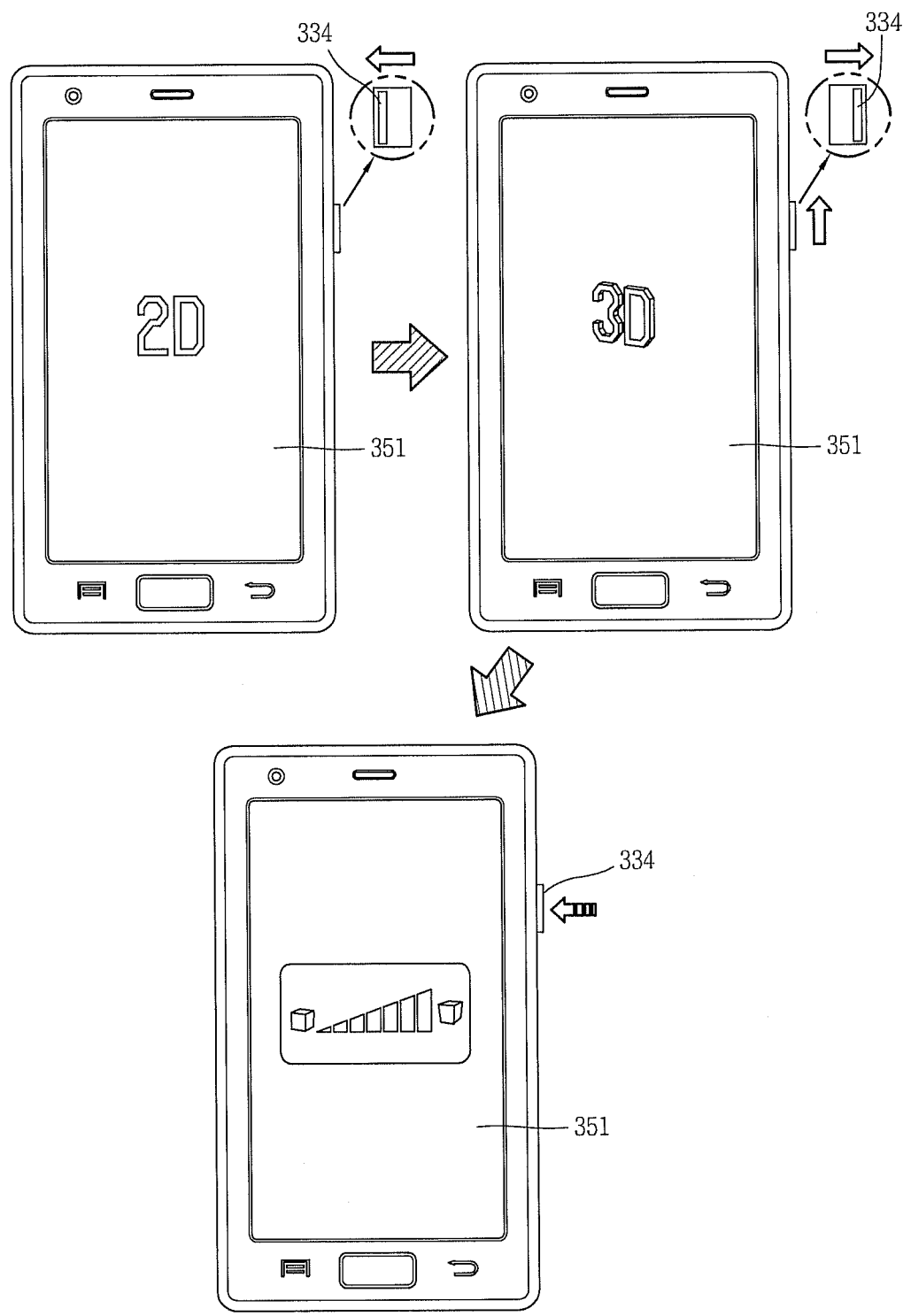

MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2011-0078802 filed in Republic of Korea on Aug. 8, 2011, the contents of which is incorporated by reference herein in its entirety.

BACKGROUND

1. Field

One or more embodiments herein relate to an information terminal.

2. Background

Mobile phones, pod or pad-type devices, tablets, notebook computers, media players, book readers, gaming devices, and other information terminals are continuously being upgraded to meet consumer demand. These terminals have input units that prove to be unsuitable or difficult to use for purposes of accessing many functions that are offered. Many terminals use multiple separate input units in an attempt to improve ease of use. However, use of multiple separate units is undesirable because they tend to increase complexity and at the same time increase the size of the terminal.

BRIEF DESCRIPTION OF THE DRAWINGS

FIGS. 7A to 7D show another embodiment of a manipulation unit.

DETAILED DESCRIPTION

Figure 1:
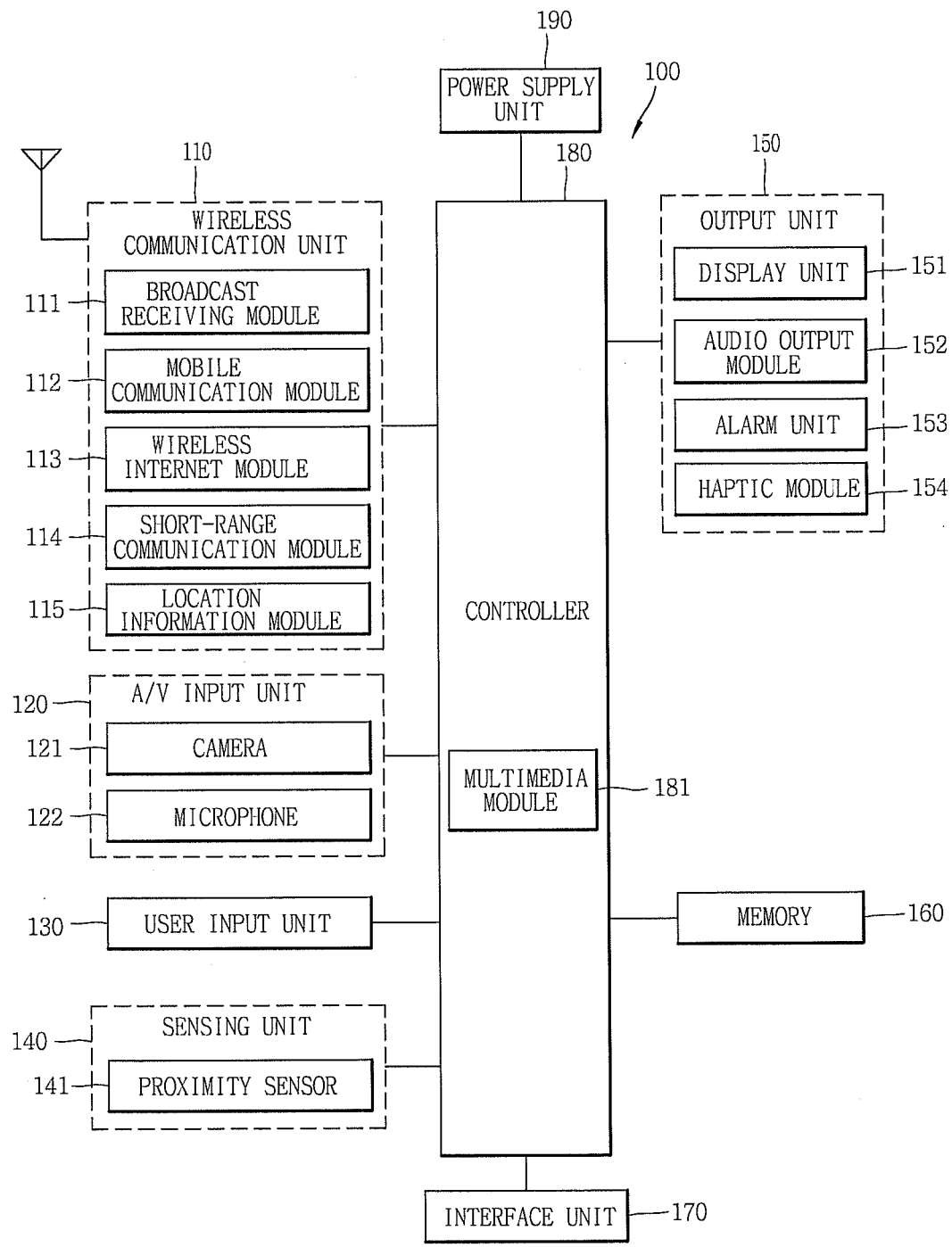
FIG. 1 shows one embodiment of a mobile terminal.

FIG. 1 shows an embodiment of a mobile terminal 100 that includes a wireless communication unit 110, an audio/video (A/V) input unit 120, a user input unit 130, a sensing unit 140, an output unit 150, a memory 160, an interface unit 170, a controller 180, and a power supply unit 190.

The wireless communication unit 110 may include one or more elements allowing radio communication between the mobile terminal 100 and a wireless communication system, or allowing radio communication between radio communication the mobile terminal 100 and a network in which the mobile terminal 100 is located. For example, the wireless communication unit 110 may include a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server through a broadcast channel. The broadcast channel may be a satellite and/or a terrestrial channel.

The broadcast management server may be or include a server that generates and transmits a broadcast signal and/or broadcast associated information, or a server that receives a previously generated broadcast signal and/or broadcast associated information and transmits to the mobile terminal 100. The broadcast signal may be or include one or more of a TV broadcast signal, a radio broadcast signal or a data broadcast signal. In one embodiment, the broadcast signal may be coupled to a TV or radio broadcast signal.

The broadcast associated information may include information regarding a broadcast channel, a broadcast program, and/or a broadcast service provider. The broadcast associated information may be provided through a mobile communication network, and in this case the broadcast associated information may be received, for example, by the mobile communication module 112. Examples of broadcast associated information include an electronic program guide (EPG) of digital multimedia broadcasting (DMB), and an electronic service guide (ESG) of digital video broadcast-handheld (DVB-H).

The broadcast receiving module 111 may receive a broadcast signal using various types of broadcast systems. For example, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), or integrated services digital broadcast-terrestrial (ISDB-T). The broadcast receiving module 111 may be configured for broadcast systems that provides a broadcast signal as well as the above-mentioned digital broadcast systems.

The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. The radio signal may include a voice call signal, a video call signal and/or various types of data according to text and/or multimedia message transmission and/or reception.

The wireless Internet module 113 may be or include a module for supporting wireless Internet access. This module may be built-in, installed externally or coupled to the mobile terminal 100. Wireless Internet access techniques that may be used include one or more of Wireless LAN (WLAN), Wi-Fi, Wireless Broadband (Wibro), World Interoperability for Microwave Access (WiMax), or High Speed Downlink Packet Access (HSDPA).

The short-range communication module 114 may be or include a module for supporting short-range communication. Examples of short-range communication technology include Bluetooth, Radio Frequency IDentification (RFID), Infrared Data Association (IrDA), Ultra WideBand (UWB), or ZigBee.

The location information module 115 may be or include a module for checking or acquiring a location of the mobile terminal. A GPS module is one example.

Referring to FIG. 1, the A/V (audio/video) input unit 120 receives an audio or video signal and the A/V (audio/video) input unit 120 may include a camera 121 and a microphone 122. The camera 121 processes a image frame such as still picture or video obtained by an image sensor in a video phone call or image capturing mode. The processed image frame may be displayed on a display module 151.

The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control one or more operations of the terminal and may be or include a keypad, a dome switch, a touch pad (pressure/capacitance), a jog wheel, and/or a jog switch.

The sensing unit 140 detects a current status of the mobile terminal 100 such as an opened or closed state of the mobile terminal 100, a location of the mobile terminal 100, an orientation of the mobile terminal 100, and the like, and generates a sensing signal for controlling the operation of the mobile terminal 100. For example, when the mobile terminal 100 is a slide phone type, it may sense an opened or closed state of the slide phone. Furthermore, the sensing unit 140 may take charge of a sensing function associated with whether or not power is supplied from the power supply unit 190, or whether or not an external device is coupled to the interface unit 170. On the other hand, the sensing unit 140 may include a proximity sensor 141.

The output unit 150 is configured to output an audio signal, video signal, and/or alarm signal, and may include display module 151, audio output module 152, alarm unit 153, and/or haptic module 154.

The display module 151 may display (output) information processed in the mobile terminal 100. For example, when the mobile terminal 100 is in a phone call mode, the display module 151 may display a User Interface (UI) or a Graphic User Interface (GUI) associated with a call. When the mobile terminal 100 is in a video call mode or image capturing mode, the display module 151 may display a captured image and/or received image, a UI or GUI.

The display module 151 may include at least one of a Liquid Crystal Display (LCD), a Thin Film Transistor-LCD (TFT-LCD), an Organic Light Emitting Diode (OLED) display, a flexible display, a three-dimensional (3D) display.

Some of these displays may be configured to be a transparent or optical transparent type to allow viewing of the exterior through the display unit, which are often referred to as transparent displays. An example of a transparent display is a transparent LCD (TOLED). Using this arrangement, a user can view an object positioned at a rear side of a terminal body through a region occupied by the display module 151 of the terminal body.

According to one embodiment, two or more display modules 151 may be included based on, for example, the type and/or functionality to be built into the terminal 100. For instance, a plurality of the display units 151 may be arranged on one surface in spaced relation or integrated with each other. In other embodiments, multiple display units may be arranged on different surfaces.

If the display module 151 and a touch sensitive sensor (referred to as a "touch sensor") have an interlayer structure, the structure may be referred to as a "touch screen." According to this arrangement, the display module 151 may be used as an input device rather than an output device and the touch sensor may be implemented as a touch film, touch sheet, and/or touch pad.

The touch sensor may be configured to convert changes of pressure or changes in capacitance applied to a specific part of the display module 151 into electrical input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals and then transmits corresponding data to controller 180, and the controller 180 may sense which region of the display module 151 has been touched.

Referring to FIG. 1, a proximity sensor 141 may be arranged at an inner region of the portable terminal 100 covered by the touch screen or near the touch screen. The proximity sensor may be or include a sensor to sense the presence or absence of an object approaching to a surface to be sensed, or an object near a surface to be sensed, by using an electromagnetic field or infrared rays without mechanical contact. The proximity sensor may have a longer lifespan and a more enhanced utility than a contact sensor.

The proximity sensor may be or include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, and/or an infrared rays proximity sensor. When the touch screen is a capacitance-type screen, proximity of a pointer to the touch screen is sensed by changes of an electromagnetic field. In this case, the touch screen (touch sensor) may be referred to as a proximity sensor.

The condition where a pointer is positioned proximate to the touch screen without contact may be referred to as "proximity touch," and a condition where the pointer substantially comes in contact with the touch screen may be referred to as "contact touch." For a proximity touch of the pointer on the touch screen, the corresponding position may be one where the pointer faces perpendicular to the touch screen upon the proximity touch of the pointer.

The proximity sensor may sense proximity touch and/or proximity touch patterns (e.g., distance, direction, speed, time, position, moving status, etc.). Information relating to the sensed proximity touch and sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, and/or a broadcast reception mode. The audio output module 152 may output audio signals relating to functions performed in the portable terminal 100, e.g., sound alarming a call received or a message received, and so on. The audio output module 152 may include a receiver, a speaker, a buzzer, and so on.

The alarm 153 outputs signals notifying occurrence of events from the portable terminal 100. The events occurring from the portable terminal 100 may include call received, message received, key signal input, and/or touch input. The alarm 153 may output not only video or audio signals, but also other types of signals such as signals notifying occurrence of events in a vibration manner. Because video or audio signals can be output through the display module 151 or audio output unit 152, the display module 151 and audio output module 152 may be categorized as being part of the alarm 153.

The haptic module 154 may generate various tactile effects which a user can feel. An example of the tactile effects generated by the haptic module 154 includes vibration. Vibration generated by the haptic module 154 may have a controllable intensity and/or controllable pattern. For instance, different vibration may be output in a synthesized manner or in a sequential manner.

The haptic module 154 may generate other tactile effects including one sensed based on an arrangement of pins that vertically move with respect to skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects through a user's direct contact or a user's muscular sense using a finger or a hand. According to one embodiment, multiple haptic modules 154 may be included based on the type and/or functionality of the terminal 100.

The memory 160 may store a program for processing and controlling the controller 180. Alternatively, the memory 160 may temporarily store input/output data (e.g., phonebook data, messages, audios, still images, videos, and the like). Also, the memory 160 may store data related to various patterns of vibrations and sounds outputted upon the touch input on the touch screen.

The memory 160 may be any type of storage medium including a flash memory type, hard disk type, multimedia card micro type, memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, or optical disk. Also, the memory 160 or another storage area may store information on or from the Internet.

The interface unit 170 may serve as an interface between terminal 100 and one or more external devices. The interface unit 170 may allow a data reception from an external device, a power delivery to each component in the portable terminal 100, or data transmission from the portable terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the portable terminal 100, which may include a User Identity Module (TEM), a Subscriber Identity Module (SIM), and/or the like. Also, an identification module (hereinafter, referred to as 'identification device') may be implemented as a type of smart card. Hence, the identification device can be coupled to the portable terminal 100 via a port.

Also, the interface unit may serve as a path for power to be supplied from an external cradle to the portable terminal 100 when the portable terminal 100 is connected to the external cradle, or as a path for transferring various command signals inputted from the cradle by a user to the portable terminal 100. Such various command signals or power input from the cradle may serve as signals for recognizing that the portable terminal 100 has accurately been mounted to the cradle.

The controller 180 may control operations of the portable terminal 100, such as control and processing of telephone calls, data communications, and/or video calls. The controller 180 may include a multimedia module 181 which provides multimedia playback, which may be configured as part of or separate from controller 180. The controller 180 may also perform pattern recognition processing so as to recognize writing or drawing input on the touch screen as text or image.

The power supply unit 190 may provide power for various components under the control of controller 180.

Various embodiments described herein may be implemented in a computer-readable medium using software, hardware, or any combination thereof.

A hardware implementation may be realized using at least one of an application specific integrated circuit (ASIC), digital signal processor (DSP), digital signal processing device (DSPD), programmable logic device (PLD), field programmable gate arrays (FPGA), one or more processors, controllers, micro-controllers, microprocessors, or electrical units designed to perform the functions described herein. In one embodiment, the functions and/or hardware may be implemented just by controller 180.

A software implementation may be realized by separate software modules or code, or a single module, that perform at least one function or operation. Software code can be implemented by a software application written in any suitable programming language. The software code may be stored in the memory 160 and executed by the controller 180.

Figure 2A:
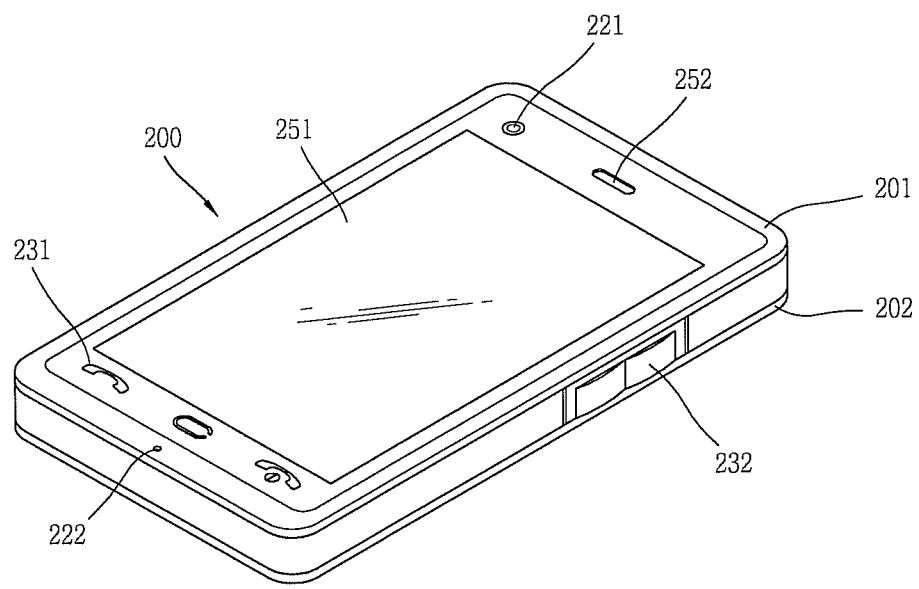
FIG. 2A shows a front view and FIG. 2B shows a rear view of the terminal.
Figure 2B:
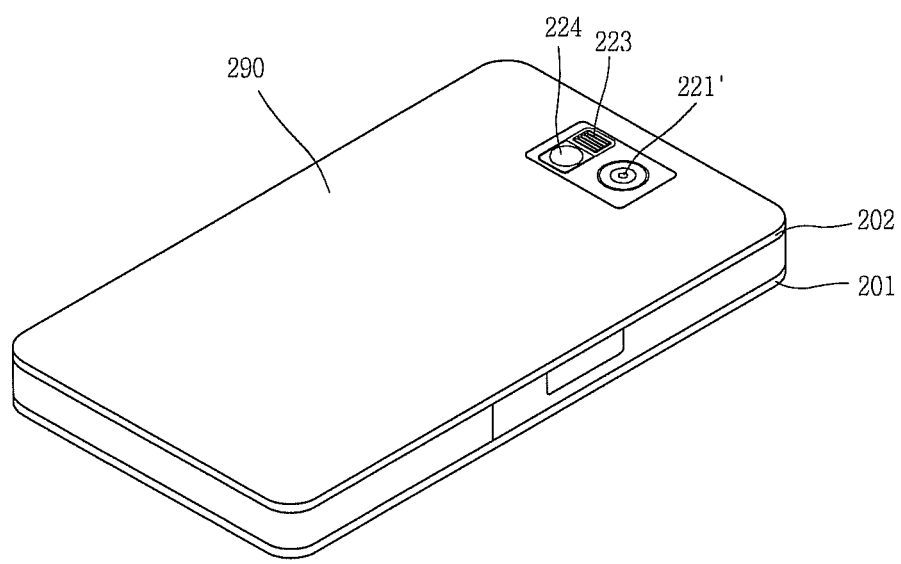

FIGS. 2A and 2B show respective front and rear views of one embodiment of a mobile terminal. The mobile terminal 200 shown is a bar-type terminal body. However, other terminal types may be used such as slide type, folder type, swivel type, or swing type in which two and more bodies are combined with each other in a relatively movable manner.

The terminal body includes a case (e.g,. casing, housing, and/or cover, etc.) which may help to form an appearance of the terminal. In one embodiment, the case may include a front case 201 and a rear case 202. Various electronic components may be incorporated in a space between the front case and rear case, and in some embodiments at least one middle case may be disposed between the front and rear cases. One or more of the cases may be formed by injection-molding a synthetic resin or may be formed of a metal material such as stainless steel (STS), titanium (Ti), or the like.

A display module 251, an audio output module 252, a camera 221, one or more user input units 130, a microphone 222, and an interface 170 may be arranged on the terminal body, for example, mainly on the front case 201.

The user input unit 130 may be manipulated to issue a command for controlling the operation of the mobile terminal 200 and may include one or more manipulation units 231 and/or 232. (The manipulation units 231, 232 may be commonly referred to as a manipulating portion). If one or more of the manipulating units is a tactile unit, the user may be allowed to perform a manipulation on or sense the manipulation unit based on a tactile feeling.

A command, content, or information input using the manipulation units 231 and/or 232 may be accomplished in various ways. For example, manipulation unit 231 may be used to receive an input to issue a command such as start, end, scroll, etc. The other manipulation unit 232 may receive, for example, different commands such as controlling volume level of the audio output module 252 or switching operation to a touch recognition mode of the display module 251. Additionally, or alternatively, the display module 251 may include a touch screen and touch sensor which also may serve as a user input unit 130.

The display module 251 may occupy a large area of the front case 201. The audio output module 252 and camera 221 may be disposed at a region adjacent to one or both ends of display module 251, and front side manipulation unit 231 and microphone 222 may be disposed at a region adjacent to the other end. Side manipulation unit 232 and interface 170 may be disposed at lateral surfaces of front case 201 and rear case 202. In other embodiments, these features may be provided at different locations.

Referring to FIG. 2B, a camera 221' may be additionally mounted on a rear surface of the terminal body, namely rear case 202. The camera 221' may have an image capturing direction which is substantially opposite to the direction of the camera 221 (refer to FIG. 2A), and may have a different pixel resolution from camera 221.

For example, camera 221 may have a low pixel resolution (e.g., but one sufficient not to cause difficulty when the user captures his or her own face and sends it to the other party during a video call or the like) and camera 221' may have a higher pixel resolution which, for example, a user may use to capture images that are not to be sent immediately. The cameras 221, 221' may be provided, for example, in the terminal body in a rotatable and pop-up manner or may be fixed or otherwise disposed.

A flash 223 and mirror 224 may be additionally disposed adjacent to the camera 221'. The flash 223 may emit light toward an object when capturing the object with camera 221', and the mirror 224 may allow a user to look at his or her own reflection when capturing himself or herself (e.g., in a self-portrait mode) using the camera 221'.

Another audio output module may be disposed on a rear surface of the terminal body. This audio output module together with audio output module 252 (FIG. 2A) at a front surface thereof may, for example, produce a stereo effect regarding sound. Additionally, or alternatively, the other audio output module may be used to implement a speaker phone mode during a phone call.

A power supply unit 190 for supplying power to mobile terminal 200 may be mounted on the terminal body. The power supply unit may be incorporated in the terminal body or may be externally coupled to the terminal body.

A touch sensor 235 for detecting a touch may be additionally mounted on the rear case 202. According to one embodiment, the touch sensor 235 may be an optical transmission type similar to display module 251. In this case, if the display module 251 may be configured to output visual information from both sides of the display module 251, then the visual information may be also recognized through touch sensor 235. The information output from the both sides thereof may be controlled by touch sensor 235. Alternatively, a display may be additionally mounted on the touch sensor 235, and a touch screen may be also disposed on the rear case 202.

The touch sensor 235 may be operated in association with display module 251 of the front case 201. Also, the touch sensor may be disposed in parallel at a rear side of the display module 251 and may have a size that is the same as or less than that of the display module 251.

Referring to user input unit 130 again, the user input unit 130 according to one embodiment may be configured to receive user inputs in multiple directions. For example, at least one of manipulation units 231, 232 in a mobile terminal may be configured to perform manipulation operations in various directions using a single body. Hereinafter, for user input unit 130, a case of the manipulation unit 232 disposed at a lateral surface of the terminal will be described as an example.

Figure 3:
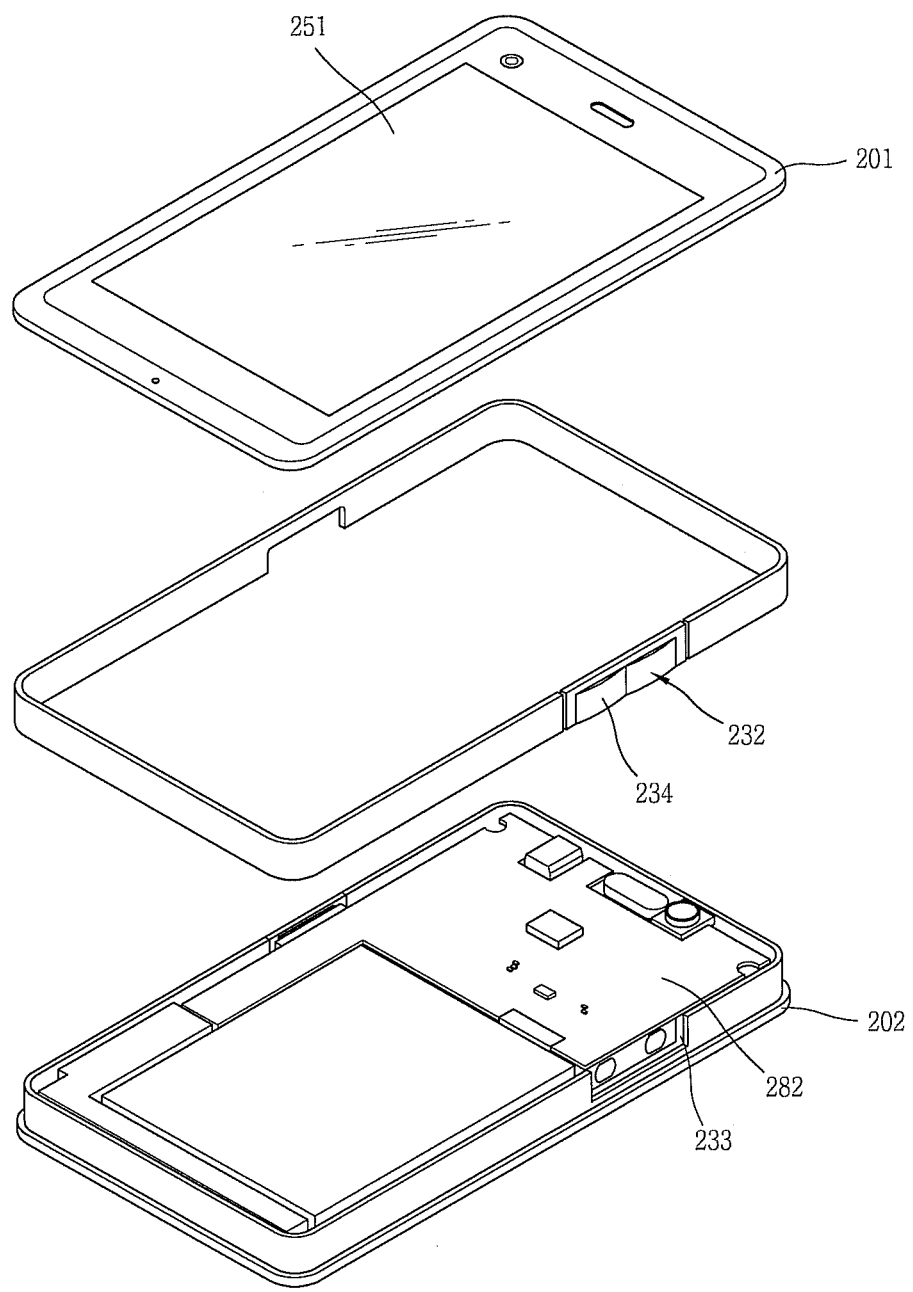
FIG. 3 shows an exploded view of a rear portion of the terminal.
Figure 4A:
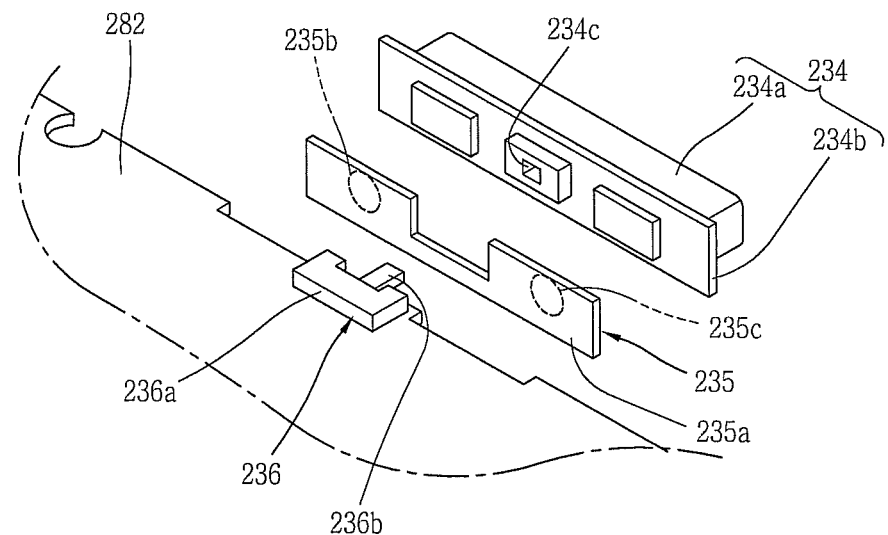
FIGS. 4A and 4B shows different views of a manipulation unit.
Figure 4B:
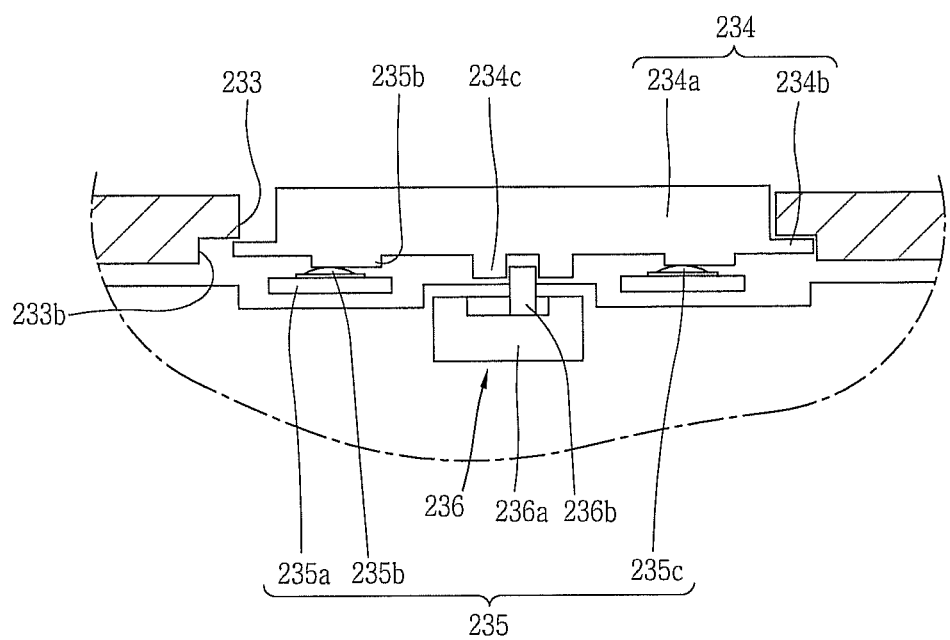

FIG. 3 shows a disassembled view of the mobile terminal in FIG. 2B, FIGS. 4A and 4B show disassembled and cross-sectional views of a manipulation unit in FIG. 3, and FIGS. 5A through 5C show operational views of this manipulation unit.

Referring to FIG. 3, the display module 251 may be mounted along a surface of the front case 201 of the terminal body. According to one embodiment, the display module 251 may include a window display element and may be formed to sense a touch input.

A circuit board 282 for controlling the display module may be incorporated in the terminal body. The circuit board may be mounted at the front case 201, rear case 202, or at another location or may be mounted at an additional internal structure. Additionally, the circuit board 282 may be disposed to cover an inner surface of the rear case 202. In this embodiment, front case 201 and rear case 202 are separately configured; however, in other embodiments cases 201, 202 may be formed as an integral body.

Various electronic elements may be mounted at a surface of the circuit board 282, and a shield member for protecting electronic elements can be mounted at the surface. The shield member may be electrically connected to the circuit board to increase a ground plane of the circuit board.

The circuit board 282 may be configured as an example of the controller 180 (FIG. 1) for performing various functions in a mobile terminal. In an alternative embodiment, a plurality of circuit boards 282 may be provided therein to perform the function of the controller 180 using their combinations. Furthermore, the circuit board 282 may be electrically connected to an antenna device to process radio signals (or radio electromagnetic waves) being transmitted and received by the antenna device.

The manipulation unit 232 may be, for example, a side key for use in controlling audio volume to be output from audio output module 152 and also may be used perform other functions.

FIGS. 3 and 4 show an example of the manipulation unit 232. This unit may include or be coupled to a mounting portion 233 formed at a surface of the terminal body. The mounting portion 233 may include a recess at a lateral surface of the terminal case and a button portion 234 may be disposed at the mounting portion 233.

The button portion 234 may be formed to receive user inputs in first and second directions that may cross or be perpendicular to each other. More specifically, the first direction may be a direction passing through a lateral surface of the mobile terminal. In this direction, button portion 234 may be allowed to be pressed (thereby operating as a push input) to allow user inputs to be entered. After pressing and release, the button portion may be restored to an initial position. The second direction may extend in a length direction of the mobile terminal. In this direction, the button portion may slide to allow a user input to be entered.

The button portion 234 may include a button body 234a and a guide wing 234b. A guide groove 233b of the mounting portion 233 may be located adjacent the button portion to allow user inputs to be entered in both directions.

According to one embodiment, the button body 234a may be have a bar shape with ends that deflect or which otherwise can be rotated. When the ends deflect, they may activate or otherwise come into contact with switches (or a contact) to generate a signal to perform a function. In order to implement a push input, first switch portion 235 may overlap button portion 234.

In operation, the first switch portion 235 may be activated to generate a first input signal when pressure is applied to button portion 234 in the first direction. For example, the first switch portion 235 may include dome switches 235b, 235c disposed on a circuit board 235a (or flexible circuit board) which is coupled to an inner portion of the mobile terminal. The circuit board 235a may be electrically connected to circuit board 282 configured with or which provides a coupling to controller 180 (FIG. 1). As a result, controller 180 may process user inputs associated with different commands or functions are input through activation of respective ones of switches 235b and 235c.

Figure 5A:
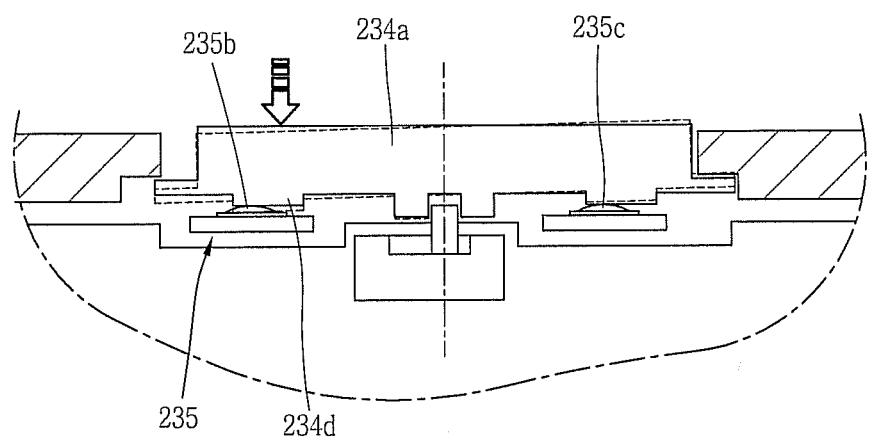
FIGS. 5A through 5C show additional views of the manipulation unit.
Figure 5B:
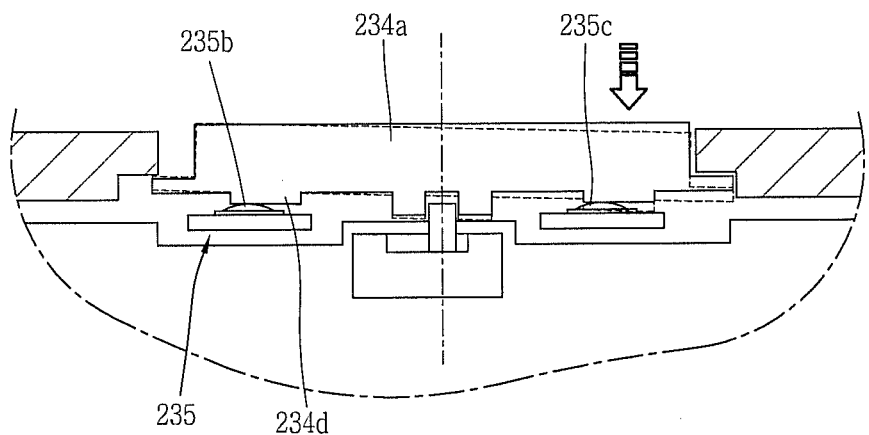

FIGS. 5A and 5B show examples of how the dome switches 235b and 235c may be activated. In accordance with one embodiment, the first dome switch 235b may be disposed to be pressed by one end of button body 234a and the second dome switch 235c may be disposed to be pressed by another or an opposing end of the button body 234a. In this regard, the dome switches may overlap respective ends of the button body; however, in another embodiment this overlap may not be necessary as a different structure (e.g., extension pieces) may be used to activate the switches when the ends are pressed. When used to control volume, the dome switches 235b, 235c may generate signals for respectively increasing and decreasing the volume of audio output module 252 (FIG. 2A).

Referring to FIGS. 3 and 4 again, button body 234a is also configured to slide back and forth, in the second direction, relative to the mounting portion 233. In order to allow the button body to slide into positions for entering commands, the width of mounting portion 233 may be longer than a width of button body 234a.

More specifically, the button body 234a may be slide between sides of the mounting portion 233 to advance and retract guide wings 234b located on ends of button body 234a into and out of respective guide grooves 233b of the mounting portion 233. According to one embodiment, the guide wings 234b may be formed to protrude in opposite directions from respective ends of button body 234a. In other embodiments, only one of the guide wing 234b may protrude only one side of button body 234a, or neither side of the button body may include a protrusion. In this latter case, side surfaces of the button body may be spaced from side surfaces of the mounting portion.

As shown in FIGS. 4B, 5A, and 5B, the guide groove 233b may be formed along a sliding direction of the button body 234a to allow the guide wing 234b to be inserted and slide therein. The guide groove 233b may be located at both ends of the mounting portion 233, and formed to be recessed at an inner surface of the case.

Figure 5C:
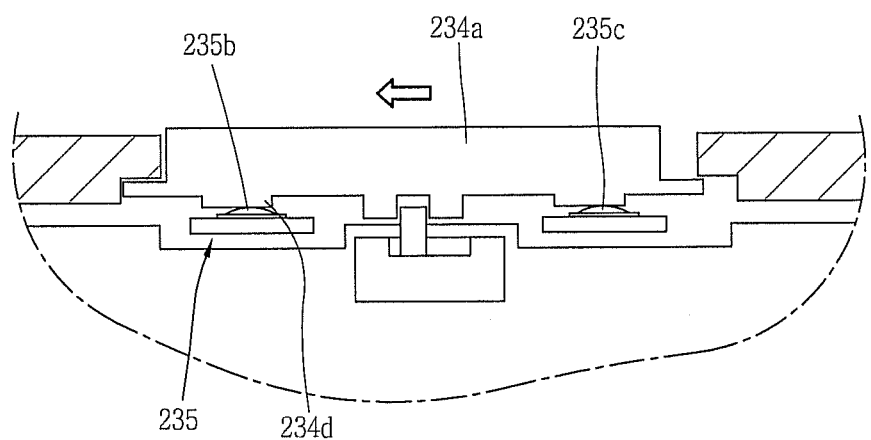

Referring to FIGS. 4 and 5C, in order to generate a signal for a command or other user input for movement in the second direction, a second switch 236 may disposed adjacent to the first switch portion 235. More specifically, when the button body moves in the second direction, the second switch 236 may be switched to generate a second input signal, for example, by causing the button portion 234 to move a position of the second switch in the second direction.

To effect switching of the second switch, the second switch 236 may, for example, include a switch body 236a located between dome switches 235b, 235c on the circuit board 282. A latch portion 234c which, for example, may snap into or otherwise contact second switch 236 may be disposed between ends of the button body 234a. According to one embodiment, a manipulation protrusion 236b may protrude from the switch body 236a, and the manipulation protrusion 236b may be latched or otherwise be made to move by latch portion 234c when the latch portion slides in the second direction to generate a second input signal.

The second input signal may be a signal for turning on or off the display module 251 (FIG. 2A). More specifically, a sliding manipulation of the button portion 234 generates a signal for turning on or off a display element.

According to one embodiment, the mobile terminal may be considered to be in a "locked state" or a "released state" according to whether or not a user control command input. The locked state may be a state in which a display element is turned off.

More specifically, in the locked state, one or more user input control commands for an application in the mobile terminal are restricted. The locked state may be provided, for example, to prevent a function or application from being activated or deactivated through unintentional entry of a user control command, e.g,. through entry of an unintentional touch input. Accordingly, in the locked state, a user control command input for display module 251 and/or other user input units 230 may be prevented or otherwise limited to within a preset range.

Moreover, a locked state may be automatically activated based on a condition where a user input has not been sensed for a prescribed period of time. The prescribed period of time may change based on a pre-programmed setting or based on a setting entered by a user. Additionally, or alternatively, the mobile terminal may be placed in a locked state when a specific key (for example, a hold key) of the mobile terminal is pressed by the user. The specific key may be manipulation unit 232, a keypad key, a menu option, and/or another key.

The released state may be implemented, for example, when the specific key is pressed while the mobile terminal is in the locked state and/or based on manipulation of a predetermined key or menu item of display module 251 and/or based on manipulation of user input unit 230.

Through this arrangement, a user input unit capable of performing various manipulations using a single body may be implemented through use of button portion 234 which is configured to receive user inputs in multiple directions.

Referring to FIG. 5C again, an operation surface (shaft or protrusion) 234d extends toward the first switch portion 235 may be formed at the button body 234a, and the operation surface (shaft or protrusion) 234d extends toward the first switch portion 235 within a sliding range of the button body 234a. The operation shafts may overlap respective ones of the dome switches, to allow different user inputs to be entered in the first direction when the dome switches are actuated. According to one embodiment, irrespective of the sliding position of the button body 234a in the second direction, the operation shaft 234d may still overlap respective ones of the dome switches 235b and 235c to allow inputs to be made. With this arrangement, push inputs may be entered regardless of whether the terminal is in the locked state or released state. In other embodiments, push inputs may be restricted in one or both of the first or second directions in the locked state.

Referring to FIGS. 5A and 5B, in accordance with one embodiment, both ends of button body 234a may rotate relative to latch portion 234c. For example, latch portion 234c may be fixed or maintained in a substantially stationary position (e.g., portion 234c may correspond to a pivot point) relative to manipulation protrusion 236b of the switch body 236a, and the button body 234a may be tilted or rotated around this position. Because latch portion 234c serves as a rotational center or pivot point, a complicated structure for implementing a push mechanism of the button body 234a can be avoided.

In one embodiment, first and second input signals may perform audio control and/or hold functions. In other words, the first and second input signals may control different functions or operations. In other embodiments, functions or operations unrelated to audio control may be entered by these input signals.

Figure 6A:
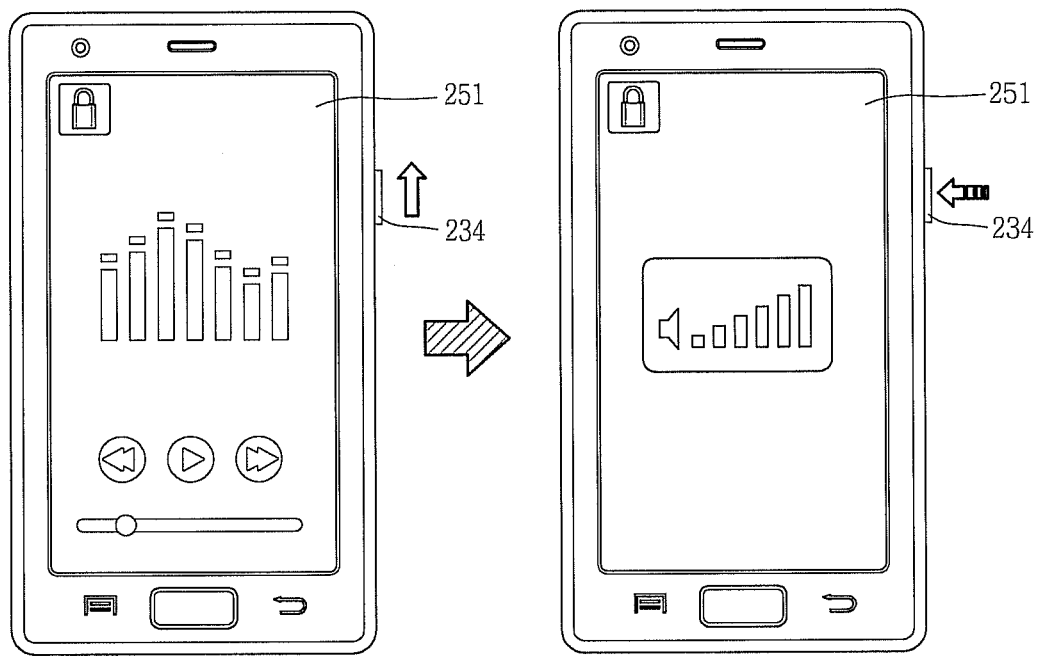
FIGS. 6A to 6B show functions controlled by the manipulation unit.
Figure 6B:
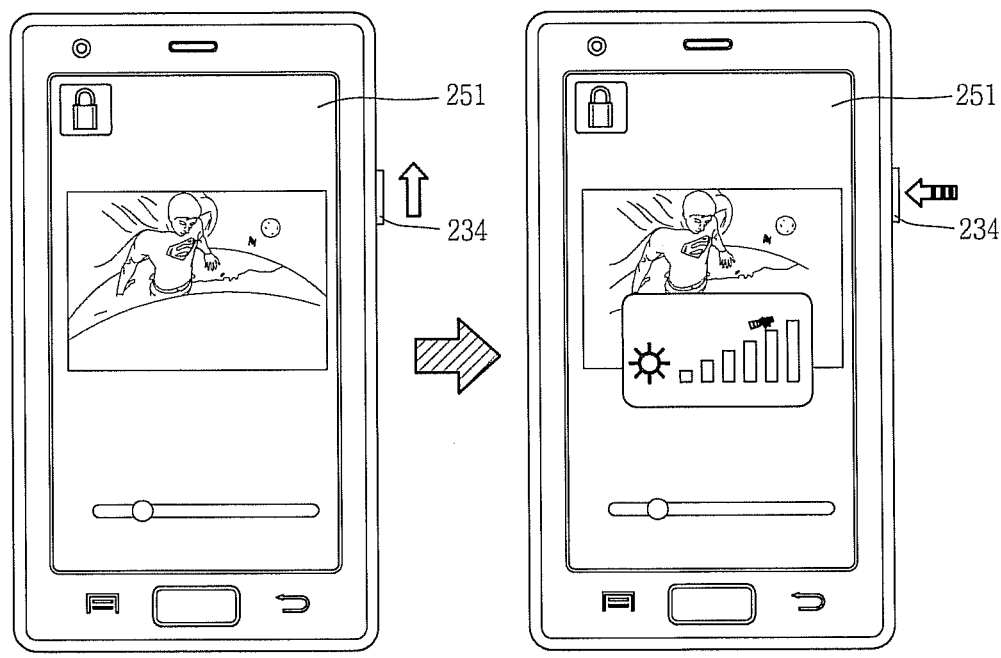

FIGS. 6A and 6B show examples of functions that may be controlled by the manipulation unit in FIG. 3. Referring to FIG. 6A, the display module 251 of a mobile terminal may be configured to enable a touch sensing and the second input signal may be a signal for deactivating a touch sensing against at least part of the display module 251. However, the display module 251 maintains an ON state. In this manner, the state in which a touch input to all or part of the display unit is disabled but the display module 251 is turned on may be referred to as a locked screen.

In this example, if button portion 234 is made to slide in the second direction while an application (music application in case of FIG. 6A) is implemented in a mobile terminal, the execution screen of the display module 251 becomes a locked screen.

In one implementation of a locked state, any touch input may be limited or restricted and in the example under consideration in the screen may be locked. As a result, an unintended or erroneous user input can be avoided.

If the button portion 234 is pressed in a state of the locked screen, the mobile terminal may be controlled to drive a function associated with the first input signal. For example, audio volume adjustment output from the audio output unit 252 in the state of the locked screen may be controlled through a push input of the button portion. As a result, a user can control the function of an application using button portion 234 while limiting a touch input to the execution screen of the application using the same button portion 234.

On the contrary, the second input signal may be a signal for locking a function associated with the first input signal. In other words, it may be possible to implement a state that audio volume cannot be adjusted even if the button portion 234 is push-manipulated while being switched to a locked screen by a sliding manipulation of the button portion 234.

In case where the second input signal is a signal for deactivating touch sensing, then the first input signal may be a signal for controlling a different function according to a kind of the executed application.

Referring to FIG. 6B, when a user slides the button portion 234 in the second direction to a first position, different functions may be performed by pushing ends of the button portion 234 in the first direction. When a user slides the button portion in the second direction to a second position, additional different functions may be performed by pushing the ends of button portion 234 in the first direction. Thus, for example, in case of a video play application, an input signal entered by pushing button one end of button portion 234 in the first direction when this button portion is slid to a first position may adjust display brightness. And, when button portion is slid to a second position, the same end of button portion 234 may adjust audio volume.

Figure 7A:
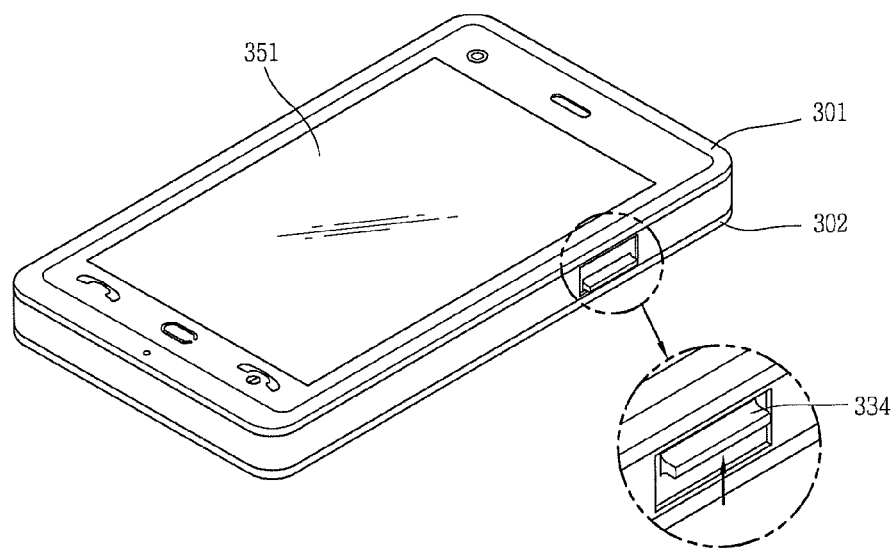

FIGS. 7A through 7D show another embodiment of a manipulation unit for a mobile terminal. in FIG. 3. Referring to FIG. 7A, the button portion 334 is configured to be moved to different vertical positions, e.g., may be formed to slide in a direction along a lateral surface of the terminal body. Guide wings may be protruded at both lateral surfaces (e.g., upper and lower portions) of the button body and guide grooves may be formed at corresponding side walls of the mounting portion.

According to this embodiment, a second input signal generated by a sliding operation of the button portion 334 may be a signal related to a terminal setting, and a first input signal inputted by a push operation of the button portion 334 may be an input signal associated with a detailed setting of the terminal. However, these input signals may control other terminal functions. Also, button portion 334 may be configured to slide along a lateral surface of the mobile terminal.

Figure 7B:
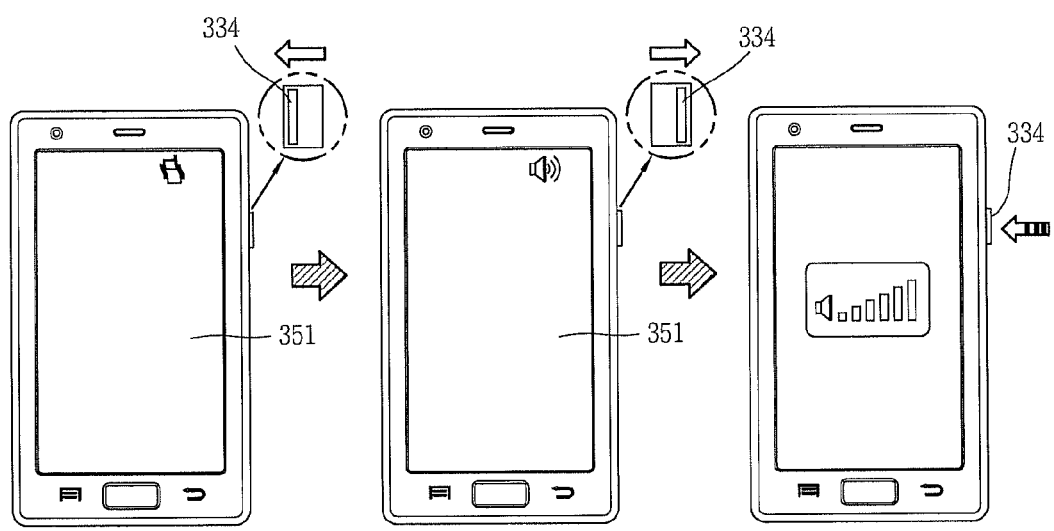

Referring to FIG. 7B, for example, the second input signal may be a bell or vibration setting signal generated when receiving a phone call, and the first input signal may be a signal for controlling the volume of a bell or vibration. If the user slides the button portion 334 in a vertical direction to a first position, then the bell may be selected. If the button portion 334 is pushed inwardly (e.g., towards an interior of the terminal body in a direction crossing or perpendicular the slide direction) in that state, then the volume of the bell may be adjusted.

If the user slides button portion 334 in the vertical direction to a second position, then a vibration function may be selected and the rate of frequency of the vibration may be adjusted when a push operation is executed on the button portion 334 in the direction perpendicular or crossing the slide direction, e.g., when the button is pushed in a direction toward an interior of the terminal.

FIG. 7C shows another example of functions that may be controlled by the manipulation unit. According to this example, a second input signal may be a switching signal between a 2D mode and a 3D mode, and a first input signal may be a signal for configuring the detailed functions of the 2D and 3D modes. As with the previous embodiment, the second input signal used to select the mode of the terminal may be generated based on sliding the manipulation unit to up and down positions. The first input signal may be generated by pushing the manipulation unit in a direction towards the terminal body.

Functions that may be controlled by the first input signal include 3D depth adjustment. In other words, if the user slides the button portion 334 in a side direction to a first position, then the state of a mobile terminal is switched to a 3D mode to display a 3D image on the display unit. In this case, it may be possible to control a 3D depth being displayed by a push input of the button portion.

Figure 7D:
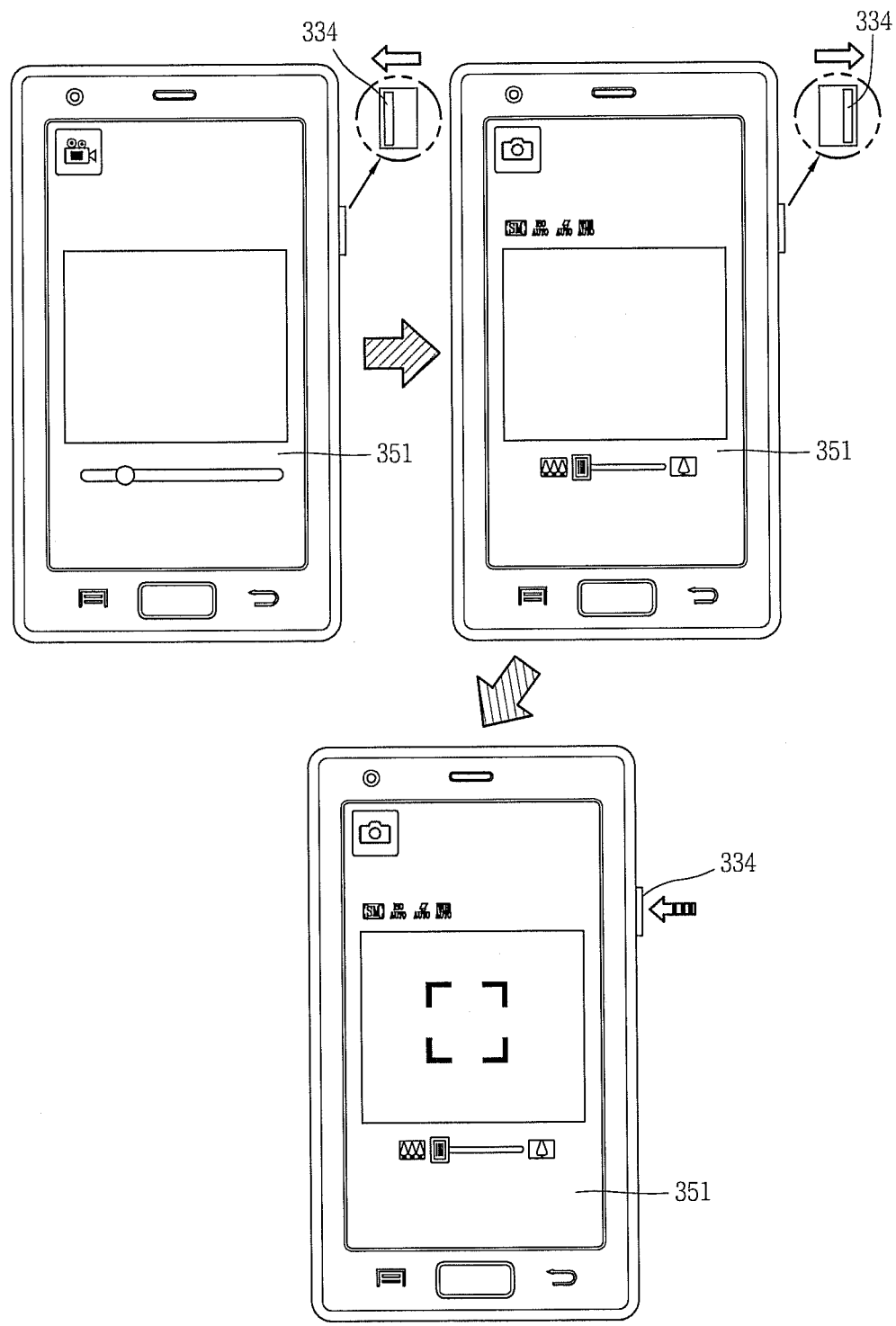

FIG. 7D shows another example of functions that may be controlled by the manipulation unit. In this case, sliding the manipulation unit to respective vertical and up and down positions may cause the terminal to switch between a camera capture mode and a video capture mode. Pushing the manipulation unit in a direction towards an interior of the terminal body while capturing a video stream may cause a camera capture function to be implemented. And, pushing the manipulation unit in the same direction while in camera mode may cause a picture to be taken.

FIGS. 8A through 8E show another embodiment of functions controlled by a manipulation unit in FIG. 3. The input signal generated when a user slides the button portion in the second direction may lock a touch input to an application screen of the display unit. Pushing the button portion inwardly may switch the execution screen to another application.

For example, if the screen of one applications is displayed on the display module 251 and a user slides button portion 234 to a first position, then a touch input to the screen may be locked. (A screen to which a touch input is locked may be referred to as a locked screen). In this case, if push input is received from button portion 234, then the displayed execution screen will be replaced the execution screen of a different application.

Figure 8A:
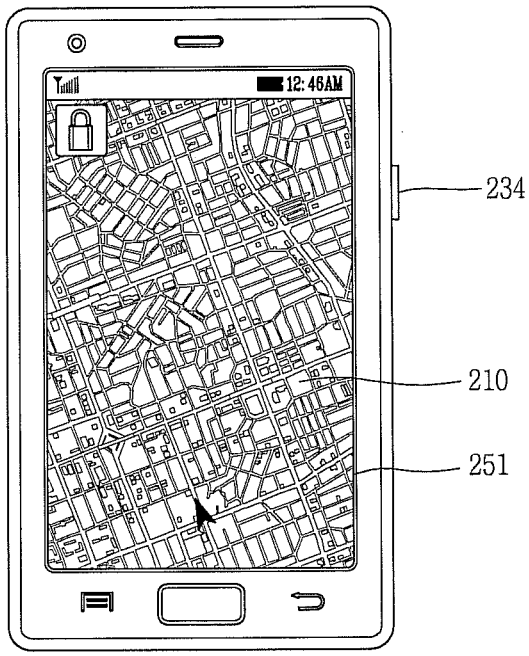
FIGS. 8A through 8E show other functions of the manipulation unit.
Figure 8B:
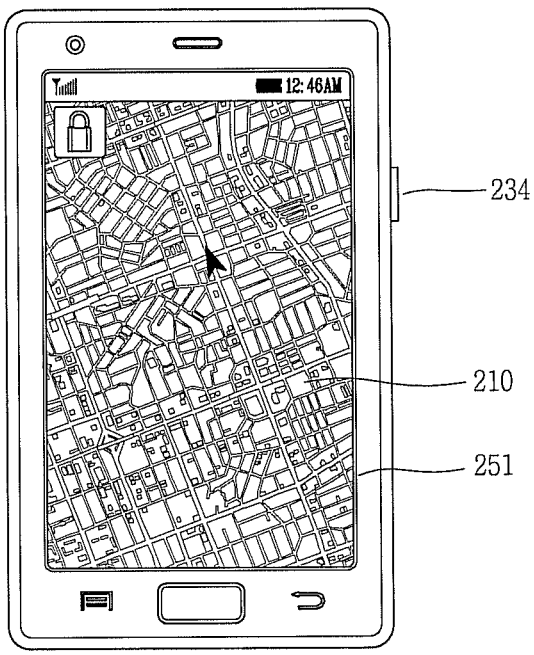

According to one specific example, referring to FIG. 8A, the execution screen 210 of an application displayed on the display module 251 may include a map associated with a navigation application. If a user slides button portion 234 in this state or a push input is received, the execution screen becomes a locked screen. As illustrated in FIG. 8B, the mobile terminal may be configured to update the execution screen 210 of an application being displayed on the locked screen according to the execution of applications.

Figure 8C:
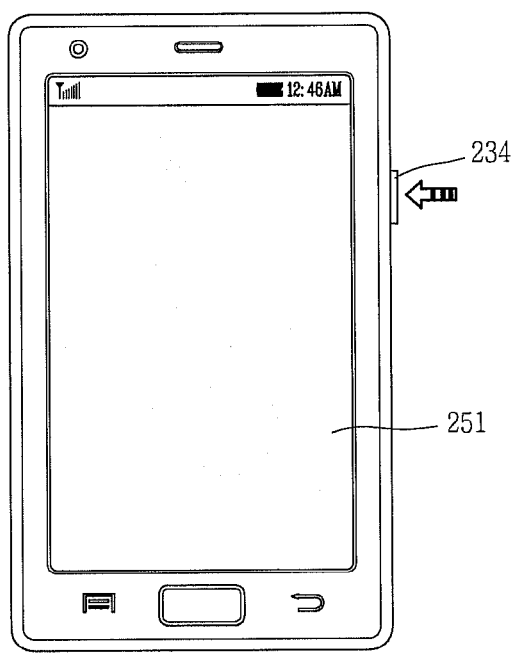
Figure 8D:
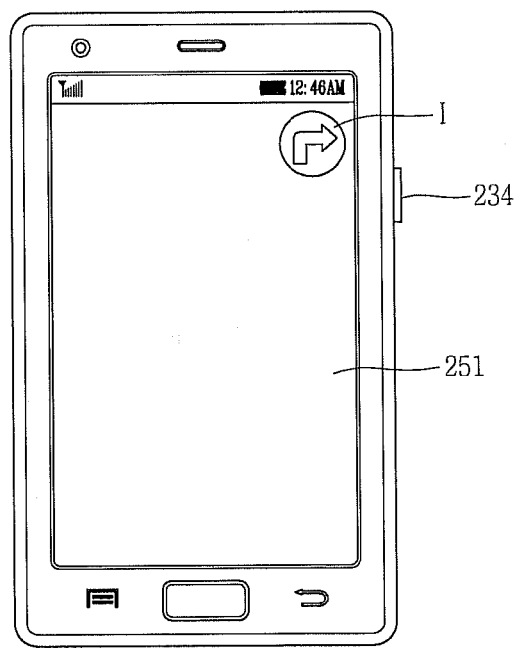
Figure 8E:
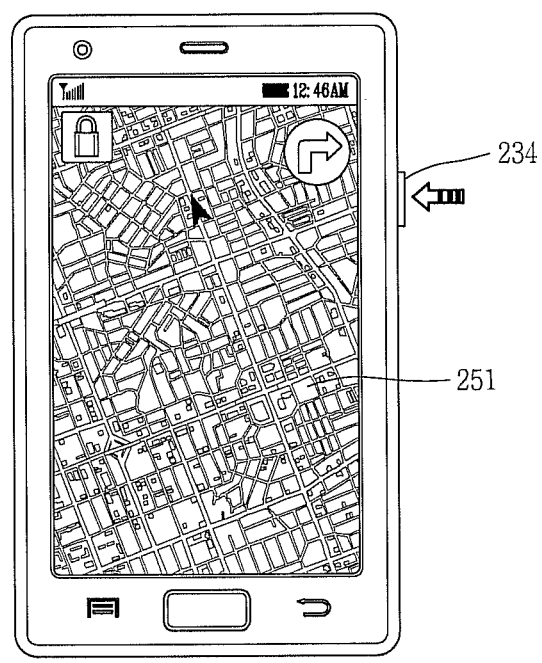

Referring to FIG. 8C, the execution screen is switched to a "play screen" associated with the video play application by a push input of the button portion 234 in this state. Furthermore, if a new event (for example, notification of a change of the heading direction in navigation, refer to FIG. 8D) occurs when the execution screen has been switched, the display unit may display an icon (I) indicating this event. In this case, if the button portion is pressed again, then the execution screen of an application prior to being switched will be displayed again on the display unit (refer to FIG. 8E).

According to another example, when a text message is received while the execution screen 210 of a video play application is displayed as a locked screen, controller 180 (FIG. 1) of the mobile terminal may display a notification icon on the display unit. In this case, if a push input is applied through the button portion, then an execution screen related to a text message instead of the execution screen 210 of the video play application will be displayed on the display unit. In this manner, various modifications can be made in both a structural aspect as well as in a functional aspect.

Figure 9:
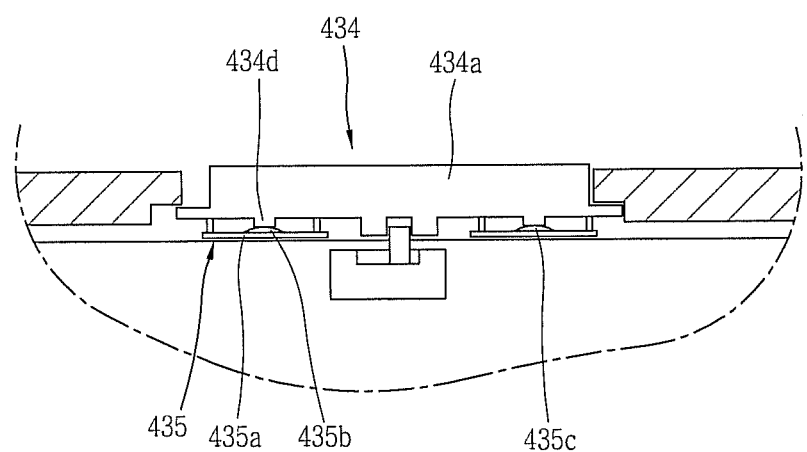
FIG. 9 shows another embodiment of the manipulation unit.

FIG. 9 shows another embodiment of a manipulation unit which includes a first switch portion 435 and button body 434a to move in interlock with a sliding of the button body 434a of the button portion 434. For example, the first switch portion 435 and button portion 434 may be configured to include a flexible circuit board 435a mounted in opposing relation to button body 434a and a plurality of dome switches 435b and 435c may be disposed on the flexible circuit board.

According to this arrangement, unlike one or more previous embodiments, the area of operation surfaces (shaft or protrusion) 434d in contact with respective ones of the dome switches 435b and 435c are smaller to enhance operation reliability and in order to allow a user to better feel a clicking sensation when a signal is input.

Furthermore, additional functionality may be realized by pushing the button portion 434 in a manner that causes both dome switches 435b, 435c to be simultaneously switched. When this occurs, for example, the power of the terminal body may be turned on or off.

For example, the power may be turned on if both dome switches are pressed at the same time when the button portion is slid to a first position. Conversely, the power may be turned off if the dome switches are pressed at the same time when the button is slid to a second position. The combinations of a sliding and push inputs associated with power on/off can be changed based on the manufacturer's or user's option.

Figure 10A:
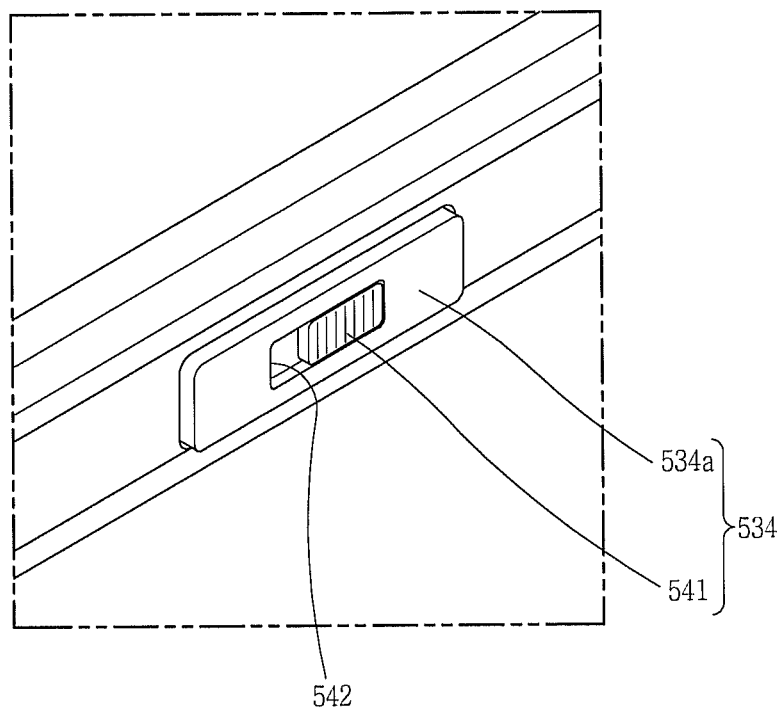
FIGS. 10A and 10B show another embodiment of a manipulation unit.
Figure 10B:
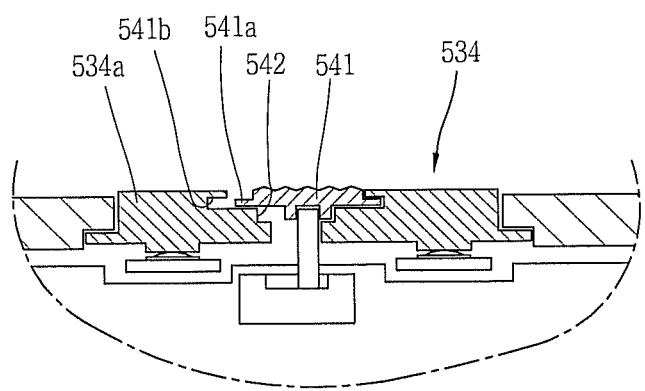

FIGS. 10A and 10B show another embodiment of a manipulation unit which includes a button portion 534, a button body 534a, and a sliding body 541. The button body 534a may be configured such that one end thereof can be rotated or deflected relative to another end thereof and/or vice versa.

A through hole 542 is formed at a surface of the button body 534a, and the sliding body 541 is mounted in the through hole 542 and formed to slide within the through hole 542. Sliding body 541 is separate from button body 534a. As a result, moving sliding body 541 to different positions does not cause the button body 534a to slide. According to one embodiment, button body 534a and sliding body 541 may be incorporated within as same modular unit.

Furthermore, a slide wing 541a formed on at least one side of the sliding body 541 may be provided to guide sliding of the sliding body 541, and a slide groove 541b is provided at the button body 434a into which the slide wing 541a may be inserted. According to one embodiment slide wings may be provided on opposing ends of the sliding body for insertion into respective grooves.

Figure 11A:
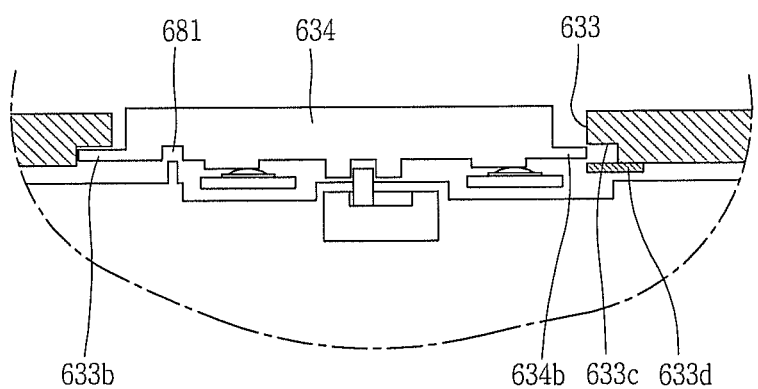
FIGS. 11A and 11B show another embodiment of a manipulation unit.
Figure 11B:
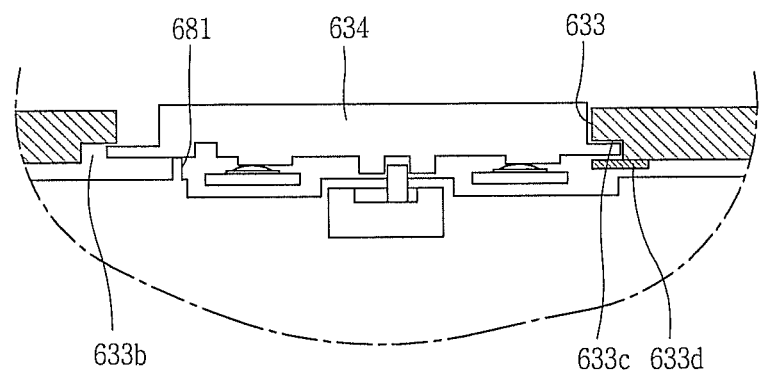

FIGS. 11A and 11B show another embodiment of a manipulation unit that includes a button portion 634 fixed to a first direction when slid in a second direction. For example, when slid to a first position the button portion generates a signal for turning on or off the display unit. In this same position, however, the button portion is prevented from moving inwardly and outwardly relative to the terminal body, i.e., the button portion may slide in a first direction but a push input in a second direction is disabled.

For example, at least one of the guide grooves 633b, 633c formed at ends of the mounting portion 633 may include a surface to fix movement of guide wing 634b in a vertical direction. The surface may include a cover 633d mounted on or adjacent the guide groove. As a result, when a user slides the button portion to a first position, guide wing 634b is inserted into the guide groove 633c to prevent the button portion from moving in a first (push) direction. As a result, the dome switch adjacent groove 633c is prevent from being actuated by a push touch upon the button portion.

In addition, a protrusion 680 may be formed to protrude at a position adjacent groove 633b to prevent the button portion 634 from actuating the other dome switch. Thus, the protrusion 680 and cover 633 may cooperate to prevent both switches from being actuated when a user slides the button portion to the first position, i.e., when guide wing 634b is inserted into groove 633c.

Conversely, when a user slides the button portion 634 to the opposite position (e.g., a guide wing slides into groove 633b), the button portion 634 is allowed to receive push inputs that will depress either or both of the dome switches. This is accomplished because guide wing 634d is removed from groove 633c and protrusion 680 is allowed to move into a recess 681. According to one example, the recess may have a depth greater than a length of the protrusion. However, in another example, the recess may have a shallower depth because the dome switch may be depressed under these circumstances.

According to one embodiment, when the mobile terminal is in a locked state, the button portion may be prevented from being unintentionally pressed or otherwise manipulated by a user.

According to another embodiment, a user input unit is provided which performs multiple manipulations in multiple directions using a single body, which includes a button portion configured to receive user inputs in multiple directions. A new type of input unit and/or user interface may therefore be provided for a mobile terminal or other type of electronic device.

According to another embodiment, a manipulation unit is provided for a mobile terminal or other electronic device for controlling the activation or deactivation of a locked screen. Using such a unit, varied inputs may be entered that could increase ease-of-use by a user and at the same time reduce size and/or complexity of the device.

According to another embodiment, a mobile terminal is provided to include an input unit which is capable of receiving inputs in multiple directions to effect the same or greater number of functions of a mobile terminal or other electronic device.

According to another embodiment, a mobile terminal associated with the present disclosure may include a terminal body, a display unit disposed at the body, and a user input unit provided at the body, wherein the user input unit includes a mounting portion recessed at a surface of the body, a button portion disposed at the mounting portion to receive user's inputs in a first and a second direction, respectively, perpendicular to each other, a first switch portion overlapped with the button portion to be switched to generate a first input signal by a press of the button portion being applied in the first direction, and a second switch portion disposed adjacent to the first switch portion to be switched to generate a second input signal by a sliding of the button portion being made along the second direction.

The button portion may include a button body for which both ends thereof are formed to be rotated, and at least part thereof is made to be accommodated and slid in the mounting portion, and a guide wing formed at the button body to guide a sliding of the button body.

The mounting portion may be formed with a guide groove into which the guide wing is inserted, formed along a sliding direction of the button body. The guide wing and guide groove may be formed at both ends of the button body and mounting portion, respectively, and a latch portion formed to be snapped into the second switch portion may be disposed between both ends of the button body. Both ends of the button body may be formed to be rotated around the latch portion, respectively.

The first switch portion may be fixed to an inner portion of the body, and an operation shaft protruded toward the first switch portion may be formed at the button body, and the operation shaft may be made to always face the first switch portion within a sliding range of the button body. The first switch portion may be combined with the button body to move in interlock with a sliding of the button body.

The button portion may include a button body an end of which is made to be rotated around the other end thereof, and a sliding body mounted in a through hole formed at a surface of the button body, and formed to be slid within the through hole. A slide wing may be formed at the sliding body to guide a sliding of the sliding body, and a slide groove may be provided at the button body to insert the slide wing.

The first and the second input signal may be input signals associated with different functions, respectively.

The display unit may be made to enable a touch sensing and the second input signal may be a signal for deactivating a touch sensing against at least part of the display unit. When the button portion is pressed in a state that the button portion is slid to generate a signal for deactivating the touch sensing, a function associated with the first input signal may be driven.

The second input signal may be a signal for locking a function associated with the first input signal.

The second input signal may be a signal for turning on or off the display unit. The button portion may be fixed to the first direction when slid to generate a signal for turning off the display unit.

The second input signal may be a signal associated with a terminal setting, and the first input signal may be an input signal associated with the detailed settings of the terminal setting.

The second input signal may be a signal for locking a touch input to an application's execution screen displayed on the display unit, and the first input signal may be a signal for switching the execution screen to a different application's execution screen. When any one of a plurality of application execution screens being executed is displayed on the display unit and the first input signal is sensed, the displayed execution screen may be disappeared and a different execution screen from the displayed execution screen may be displayed thereon among the plurality of application execution screens.

The first switch portion may include a plurality of dome switches, and the power of the body may be turned on or off when the plurality of dome switches are switched at the same time by the button portion.

According to another embodiment, a mobile terminal is provided which includes a terminal body having a front surface, a lateral surface, and a rear surface, a display unit disposed at a front surface of the body to enable a touch sensing, a manipulation unit provided at a lateral surface of the body to sense user's inputs applied in a first and a second direction, respectively, perpendicular to each other, and a controller configured to process the user's inputs applied in the first and the second direction, respectively, as control commands associated with different functions.

In accordance with another embodiment, an apparatus for an electronic device, comprising: a body; a first input unit disposed in a first location of the body; a second input unit disposed in a second location of the body; a third input unit disposed in a third location of the body, wherein: when the body moves in a first direction to a first position, the third input unit generates a signal to activate a first operational mode and the first and second input units generate signals to perform first and second functions when the body moves in a second direction different from the first direction, and when the body moves in the first direction to a second position, the third input unit generates a signal to activate a second operational mode and the first and second input unit generate signals to perform third and fourth functions when the body moves in the second direction. One or more of the first, second, or third input units may include a switch.

The first and second input units may be actuated when pressure is applied or contact is made in the first direction and the third input unit is actuated when pressure is applied or contact is made in the second direction. The first direction may be substantially perpendicular to the second direction.

The third input unit may be between the first and second input units along an axis extending in the first direction. Also, another function is performed in at least one of the first mode or the second mode when the first and second input units simultaneously generate signals.

Upon activation of the first mode: the first input unit may generate a signal to perform the first function when a first location of the body is moved in the first direction, and the second input unit may generate a signal to perform the second function when a second location of the body is moved in the first direction.

Upon activation of the second mode: the first input unit may generate a signal to perform the third function when the first location of the body is moved in the first direction, and the second input unit may generate a signal to perform the fourth function when the second location of the body is moved in the first direction.

In addition, a first limiter may be included to limit movement of the body in the second direction when the body is moved in the first direction to at least the first position. The first limiter may be located at or near the first switch. A second limiter may limit movement of the body in the second direction when the body is moved in the first direction to at least the first position, wherein the second limiter is located at or near the second switch. The body may be allowed to move in the second direction when the body is moved in the first direction to at least the second position.

In accordance with another embodiment, a mobile terminal comprises a first body; a second body which moves relative to the first body; a first input unit disposed in a first location of the first body; a second input unit disposed in a second location of the first body; a third input unit disposed in a third location of the first body, wherein: when the second body moves in a first direction to a first position, the third input unit generates a signal to activate a first operational mode and the first and second input units generate signals to perform first and second functions when the second body moves in a second direction different from the first direction, and when the second body moves in the first direction to a second position, the third input unit generates a signal to activate a second operational mode and the first and second input units generate signals to perform third and fourth functions when the second body moves in the second direction.

The first body may not move. Also, the second body may move the first body in the second direction to activate or contact the first and second input units. Also, the second body moves relative to a first surface of the first body and the first and second input units are located at a second surface of the first body.

Additionally, the third input unit may move towards a first surface of the first body when the second body is moved in the first direction to the first position, and the third input unit may move towards a second surface of the first body when the second body is moved in the first direction to the second position. A top surface of the third input unit may be higher than top surfaces of the first and second input units. Additionally, the third input unit may be between the first input unit and the second input unit.

In accordance with another embodiment, a mobile terminal comprises an input unit in accordance with one or more of the foregoing embodiments. The mobile terminal may be a portable phone, a smart phone, a laptop computer, a digital broadcast terminal, personal digital assistants (PDA), a portable multimedia player (PMP), a navigation, media player, and/or any one of a number of other information or data terminals.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. The features of one embodiment may be combined with the features of one or more of the other embodiments.

Although embodiments have been described with reference to a number of illustrative embodiments, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for an electronic device, comprising:
a body;
a first input unit disposed in a first location of the body;
a second input unit disposed in a second location of the body;
a third input unit disposed in a third location of the body, wherein:
when the body moves in a first direction to a first position, the third input unit generates a signal to activate a first operational mode and the first and second input units generate signals to perform first and second functions when the body moves in a second direction different from the first direction, and
when the body moves in the first direction to a second position, the third input unit generates a signal to activate a second operational mode and the first and second input units generate signals to perform third and fourth functions when the body moves in the second direction.

2. The apparatus of claim 1, wherein the first and second input units are actuated when pressure is applied or contact is made in the first direction and the third input unit is actuated when pressure is applied or contact is made in the second direction.

3. The apparatus of claim 1, wherein the first direction is substantially perpendicular to the second direction.

4. The apparatus of claim 1, wherein the third input unit is between the first and second switches along an axis extending in the first direction.

5. The apparatus of claim 1, wherein:
another function is performed in at least one of the first mode or the second mode when the first and second input units simultaneously generate signals.

6. The apparatus of claim 1, wherein upon activation of the first mode:
the first input unit generates a signal to perform the first function when a first location of the body is moved in the first direction, and
the second input unit generates a signal to perform the second function when a second location of the body is moved in the first direction.

7. The apparatus of claim 6, wherein upon activation of the second mode:
the first input unit generates a signal to perform the third function when the first location of the body is moved in the first direction, and
the second input unit generates a signal to perform the fourth function when the second location of the body is moved in the first direction.

8. The apparatus of claim 6, further comprising:
a first limiter to limit movement of the body in the second direction when the body is moved in the first direction to at least the first position.

9. The apparatus of claim 8, wherein the first limiter is located at or near the first switch.

10. The apparatus of claim 9, further comprising:
a second limiter to limit movement of the body in the second direction when the body is moved in the first direction to at least the first position, wherein the second limiter is located at or in the second input unit.

11. The apparatus of claim 8, wherein the body is allowed to move in the second direction when the body is moved in the first direction to at least the second position.

12. The apparatus of claim 1, wherein at least one of the first input unit, second input unit, or third input unit includes a switch.

13. An mobile terminal, comprising:
a first body;
a second body which moves relative to the first body;
a first input unit disposed in a first location of the first body;
a second input unit disposed in a second location of the first body;
a third input unit disposed in a third location of the first body, wherein:
when the second body moves in a first direction to a first position, the third input unit generates a signal to activate a first operational mode and the first and second input units generate signals to perform first and second functions when the second body moves in a second direction different from the first direction, and
when the second body moves in the first direction to a second position, the third input unit generates a signal to activate a second operational mode and the first and second input units generate signals to perform third and fourth functions when the second body moves in the second direction.

14. The mobile terminal of claim 13, wherein the first body does not move.

15. The mobile terminal of claim 13, wherein the second body moves the first body in the second direction to activate or contact the first and second input units.

16. The mobile terminal of claim 13, wherein the second body moves relative to a first surface of the first body and the first and second input units are located at a second surface of the first body.

17. The mobile terminal of claim 13, wherein:
the third input unit moves towards a first surface of the first body when the second body is moved in the first direction to the first position, and
the third input unit moves towards a second surface of the first body when the second body is moved in the first direction to the second position.

18. The mobile terminal of claim 13, wherein a top surface of the third input unit is higher than top surfaces of the first and second input unit.

19. The mobile terminal of claim 13, wherein the third input unit is between the first input unit and the second input unit.

20. The mobile terminal of claim 13, wherein at least one of the first input unit, second input unit, or third input unit includes a switch.

* * * * *